Oct. 27, 1925.
O. E. FRUNK
1,559,522
LINK SAW
Filed Jan. 6, 1925
Fig. 1.
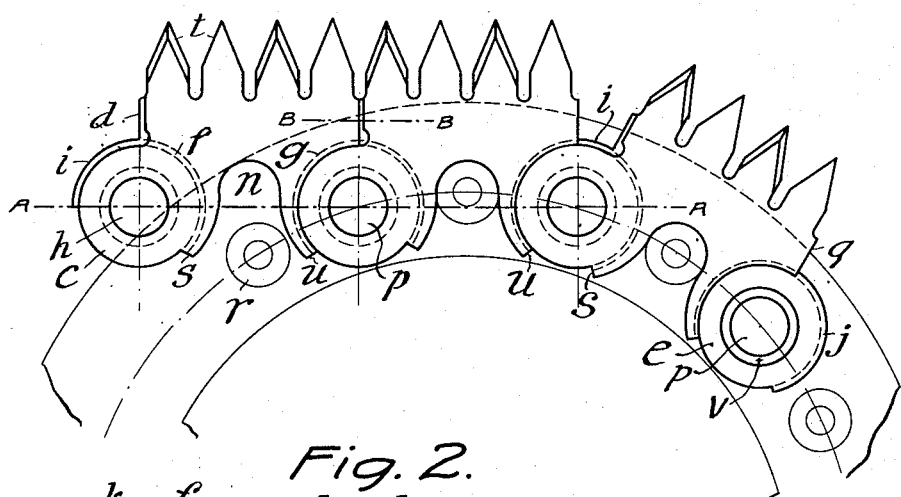
Fig. 2.
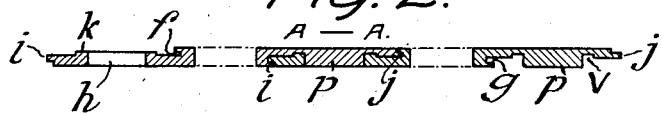
Fig. 3. Fig. 4.
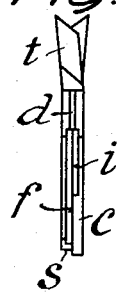 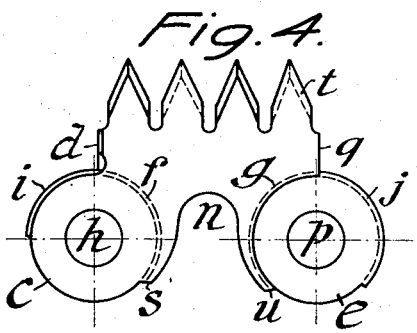
Fig. 5.
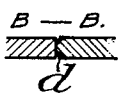
Inventor
Attr Emanuel Frunk
By
B. Singer, Atty.

Patented Oct. 27, 1925.

1,559,522

UNITED STATES PATENT OFFICE.

OTTO EMANUEL FRUNK, OF STOCKHOLM, SWEDEN.

LINK SAW.

Application filed January 6, 1925. Serial No. 911.

*To all whom it may concern:*

Be it known that I, OTTO EMANUEL FRUNK, a subject of the King of Sweden, and a resident of Stockholm, in Sweden, have invented a new and useful Link Saw, of which the following is a specification.

This saw is preferably intended for felling and cutting up trees and timbers, though it may be used also for other purposes.

It consists of a series of links pivoted together so as to form an endless chain, which may be stretched around two sprocket wheels or the like and driven by a suitable motor.

The ends of the links are reduced to about half thickness and these thin parts overlap the adjacent thin parts of the neighbour links and are pivoted to the same.

The edges of the thin parts have each a bow-shaped radial flange which is concentric with the pivot and adapted to engage and slide along a groove in the non-reduced part of the neighbour links so that the links guide themselves automatically by means of said flanges and grooves.

To prevent clogging of sawdust between the links one of the abutting edges is key-shaped.

In the drawing, which shows an example, Fig. 1 is a side view of a portion of the saw.

Fig. 2 is a section on a line a little above the line A—A of Fig. 1 looking downward.

Fig. 3 is an edge view and Fig. 4 a side view of one link.

Fig. 5 is a section on the line B—B of Fig. 1.

In the example each link has four teeth $t$ (the number may vary) on the outer edge and a notch $n$ on the inner edge adapted to engage the rollers $r$ or the like on the driving wheel $w$ (which is indicated schematically). The notch is preferably so deep that the point of contact between the link and the wheel lies on or outside of a straight line which connects the centers of two adjacent pivots.

At each of the two lower corners each link has a circular portion $c$ and $e$ respectively of about half thickness. The portion $c$ has a central hole $h$ and a concentric radial flange $i$ along a part of its free edge. The portion $e$ has a central pivot $p$ and a concentric radial flange $j$. The thickness of the flanges is about half the thickness of the portions, that is about a quarter of the thickness of the link.

The unreduced part of each link has a groove $f$ which is adjacent to the portion $c$ and concentric with the hole $h$, and a groove $g$ which is adjacent to the portion $e$ and concentric with the pivot $p$.

The flange $i$ is adapted to enter and slide along the groove $g$ of the next link to the left. The flange $j$ is adapted to enter and slide along the groove $f$ of the next link to the right.

Each link has two edges $d, q$, which abut the meeting edges $q, d$ of the neighbour links when the longitudinal directions of the links are parallel. There are also two shoulders $s$ and $u$ on each link. When the shoulder $s$ abuts the shoulder $u$ of the next link, the longitudinal directions of the two links form a right angle or about so. The flanges may have such peripheral length (say 90° or a little less) that they are free from the grooves when the shoulders $s$, $u$ abut. In such case and in such position the links may be disconnected or separated by simply lifting one from the other in the longitudinal direction of the pivot. When the saw is working, the angle between the links can never be so large that the flanges become free from the grooves.

In the example shown the flange $j$ is more than 90° so that a part of it will remain in the groove even when the shoulders abut. In this instance the two links can be separated only by bending them a little in the direction of their thickness. Their elasticity is sufficient to allow such bending without the use of any tool. As they offer a certain resistance however against such separation, they will remain in connected position and are not liable to be accidentally separated even if the saw is removed from the sprocket wheels. When connecting two links of this form, take one in each hand and, holding them in such position that the shoulders $s$, $u$ are adjacent, push the flange $j$ radially into the groove $f$ and then or simultaneously bend a little so that the pivot enters the hole.

In order to increase the axial length of the bearing hole $h$ and the pivot $p$ the part of the portion $c$ which is nearest the hole is preferably not reduced so much in thickness as the rest of said portion, whereby a collar $k$ is formed, which is adapted to enter an annular groove $v$ formed around the pivot.

The edge $d$ is key-shaped so as to touch only a narrow line of the edge $q$, thus pressing or cutting sawdust which enters between said edges in such a manner that the sawdust is easily removed.

Though the form shown and described is a good one, I do not desire to limit myself to the same, as variations are possible. So for instance the flange $i$ may be situated on the portion $e$ and the longer flange on the portion $c$. The collar $k$ and groove $v$ may be omitted as shown in Figs. 3 and 4. Every second link may have two holes and the other two pivots. This form is however generally avoided from the reason that, if the length of the saw is to be changed by inserting or removing links, it is necessary to insert or remove two links each time.

What I claim is:

1. A link saw, each link of which has two circular portions of reduced thickness and a concentric radial flange on each portion adapted to enter and slide along grooves provided in the unreduced part of the neighbour links.

2. A link saw with two portions of reduced thickness on each link, a hole in one of these portions and a pivot on the other portion adapted to enter the hole in the next link, and flanges on said portions adapted to enter grooves in the unreduced part of the neighbour links so that the links guide themselves in relation to each other.

3. A link saw each link of which has two portions of reduced thickness with a hole in one of these portions and a pivot on the other portion and a radial flange on both portions, the thickness of said flange smaller than the thickness of the portions, and grooves in the unreduced part adapted to receive said flanges of the neighbour links so that the links guide themselves automatically.

4. A link saw with two circular portions of reduced thickness on each link, a hole in one portion an integral pivot on the other portion adapted to enter the hole of the next link, flanges on the portions concentric with the hole and pivot, and grooves in the non-reduced part adjacent to the portions and adapted to receive the flanges of the neighbour links, abutting edges and shoulders on each link adapted to prevent turning of each link more than about 90° in relation to its neighbour link, at least one of the flanges being a trifle lesser than the angle between the links when the shoulders abut, so as to admit separation of the links.

5. A link saw with two circular portions of reduced thickness on each link, a central hole in one portion and a central pivot on the other portion, a collar around the hole and an annular groove around the pivot adapted to receive the collar of the next link, and means for guiding the links in relation to each other, substantially as described.

6. A link saw with two circular portions of reduced thickness on each link, a central hole in one portion and a central pivot on the other portion, abutting edges on each link, one of said edges being beveled from opposite directions and the other flat and means for automatic guiding of the links, substantially as set forth.

7. A link saw provided with links each of which has two circular portions of reduced thickness, certain of the links being each provided with a central hole and certain other of the links being each provided with a central pivot adapted to enter the corresponding hole of a neighbour link and flanges of approximately rectangular cross section on said portions arranged to enter grooves in the unreduced part of the neighbour links.

OTTO EMANUEL FRUNK.